May 3, 1932. E. ANDERSON 1,856,685
APPARATUS FOR SEPARATING SOLIDS FROM GASES
Filed May 19, 1928 3 Sheets-Sheet 1
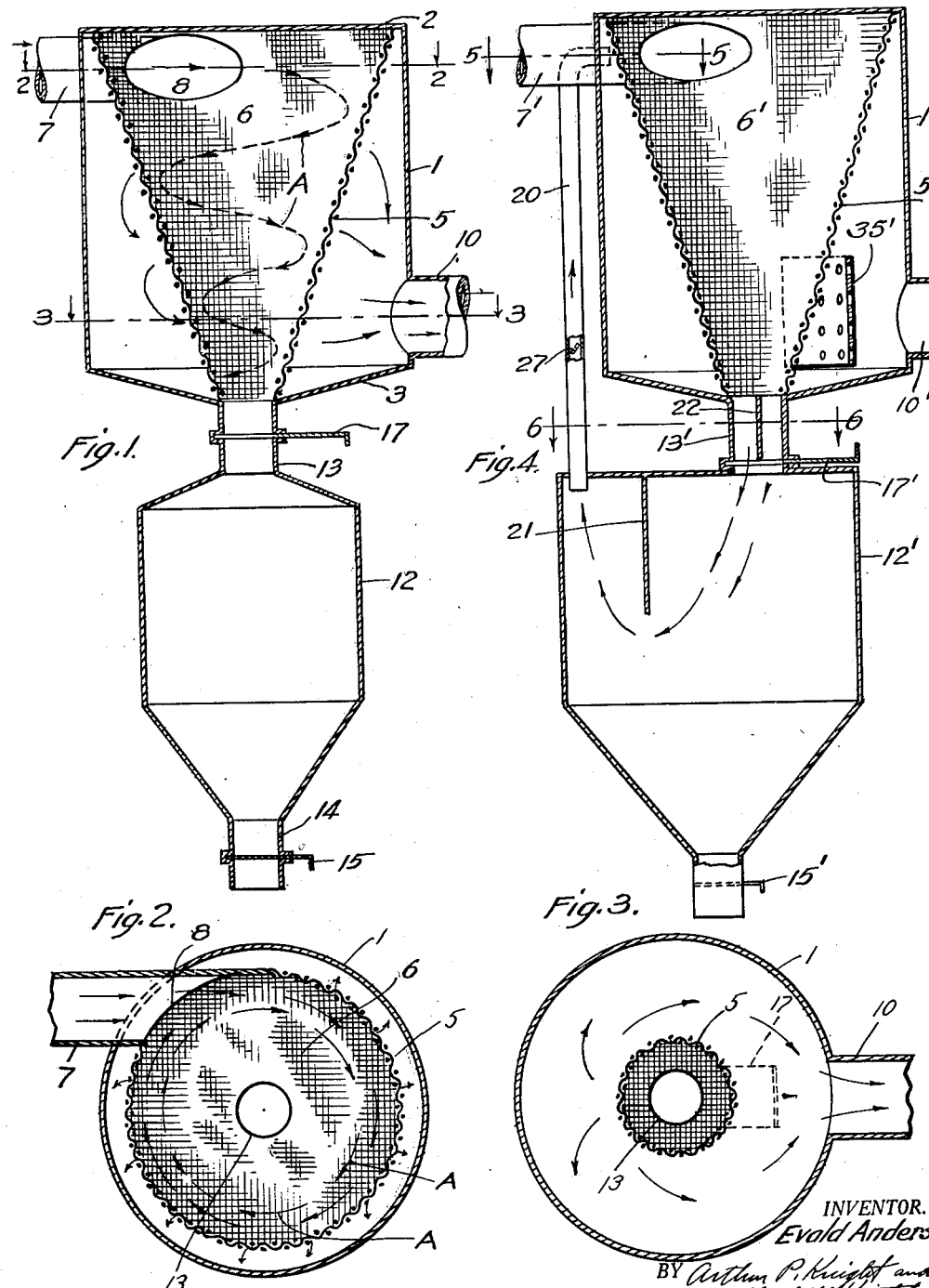

May 3, 1932.  E. ANDERSON  1,856,685
APPARATUS FOR SEPARATING SOLIDS FROM GASES
Filed May 19, 1928  3 Sheets-Sheet 2
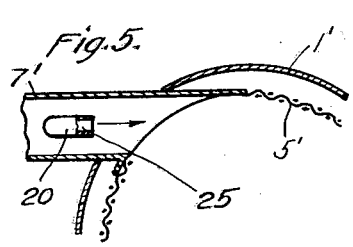
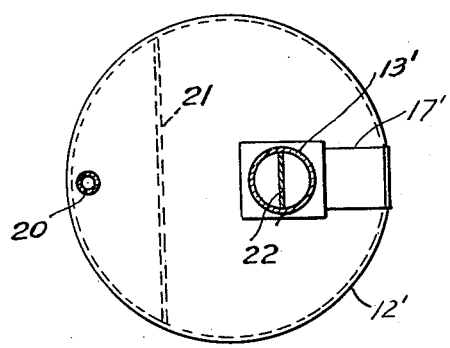
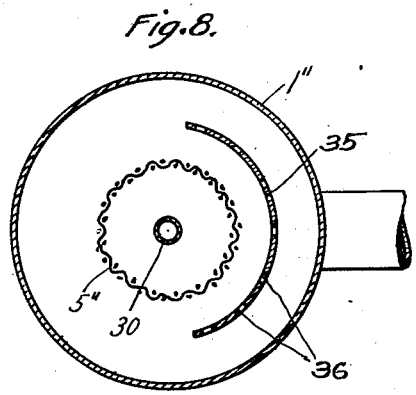
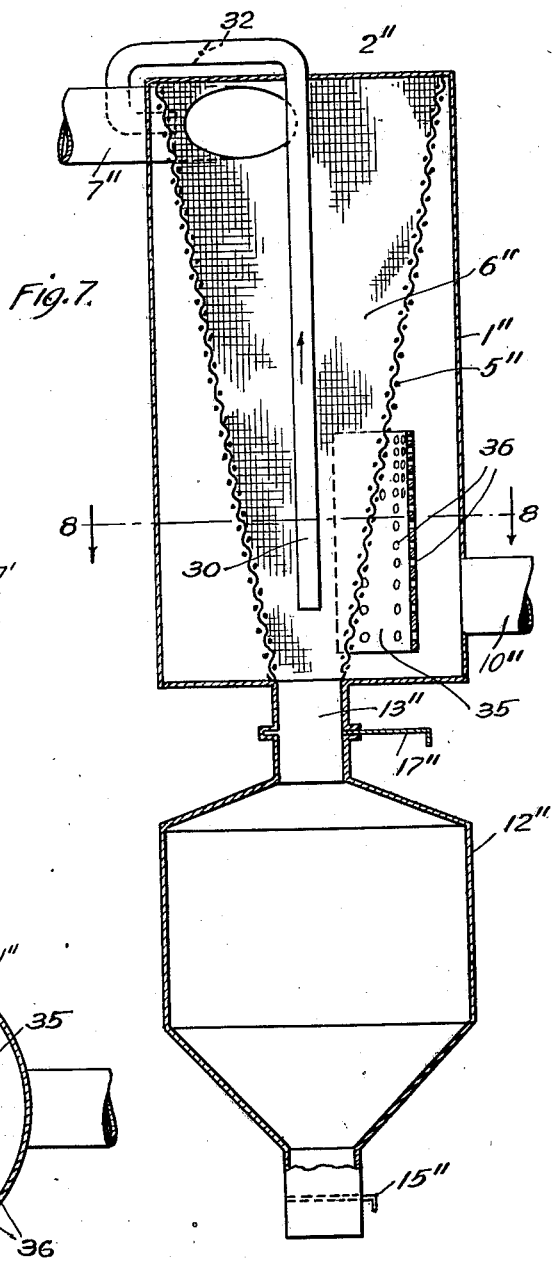
INVENTOR.
Evold Anderson.
BY
ATTORNEYS.

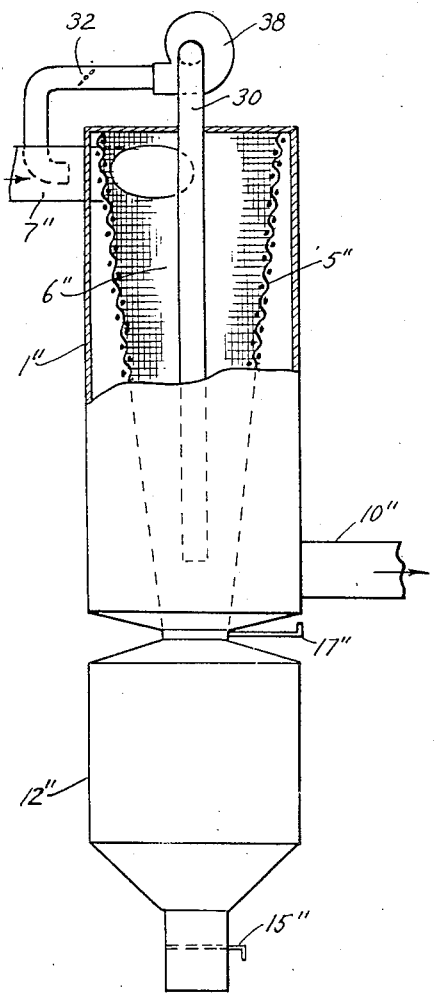

Patented May 3, 1932

1,856,685

UNITED STATES PATENT OFFICE

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR SEPARATING SOLIDS FROM GASES

Application filed May 19, 1928. Serial No. 279,101.

This invention relates to means for separating and collecting finely divided solids carried in suspension in gases and particularly to apparatus for this purpose in which the separation is effected by passing the gases through a filtering medium adapted to retain the suspended solids.

The principal object of the invention is to provide a separating apparatus of this type in which the finely divided solids retained on the filtering medium are continually removed from such filtering medium and collected at some other point so as to maintain the filtering medium in a relatively clean and open condition and thus maintain a high capacity of gas flow through the apparatus.

A particular object of the invention is the utilization of the gases delivered to the apparatus to effect the cleaning of the filtering medium and to also cause movement of the solids, swept off the filtering medium by such gases, toward and into a separate collecting chamber.

The above objects are accomplished by delivering the gases tangentially into the interior of a filter member, of conical shape, so that the gases are caused to have a whirling or cyclonic motion around the interior of said filter member, and continuously removing clean gas from the exterior of said filter member. The gases are delivered adjacent the larger end of the cone shaped filter member so that as the quantity of whirling gases within said filter member is continually diminished due to passage of some of the gas through the wall of the filter member, the decrease in diameter of the cone will serve to maintain a sufficient velocity to effect the desired sweeping of the solids off of the filtering surface. The apparatus further comprises a housing surrounding the filter member and providing a space of downwardly increasing cross-section outside the filter member, and the gas outlet means communicates with the lower portion of this outside space, so that as the proportion of the gas stream outside the filter member gradually increases, a space of increasing size is provided to accommodate the flow thereof without causing excessive velocity or consequent high loss of head.

The accompanying drawings illustrate embodiments of my invention and referring thereto:

Fig. 1 is a vertical section of one form of separating apparatus according to my invention.

Fig. 2 is a horizontal section on line 2—2 in Fig. 1.

Fig. 3 is a horizontal section on line 3—3 in Fig. 1.

Fig. 4 is a vertical section of another form of apparatus.

Fig. 5 is a partial horizontal section on line 5—5 in Fig. 4.

Fig. 6 is a horizontal section on line 6—6 in Fig. 4.

Fig. 7 is a vertical section of another modification of the invention.

Fig. 8 is a horizontal section on line 8—8 in Fig. 7.

Fig. 9 is a partly sectional side elevation of an apparatus similar to that shown in Fig. 7, showing the use of a fan or blower for creating circulation of a portion of the gas.

The apparatus shown in Figs. 1 to 3 inclusive comprises a cylindrical casing or housing 1 closed at its upper and lower ends as indicated at 2 and 3 respectively, within which is mounted a filter member 5 consisting of cloth, wire screen, or other suitable filtering medium which is pervious to gas, but is of sufficiently fine mesh to prevent passage therethrough of the solid particles to be removed from the gas. Said filter member preferably tapers inwardly toward the bottom, having, for example, the shape of an inverted cone or frustum of a cone, that is, a cone whose larger base is at the top, and said member preferably extends substantially from the top to the bottom of casing 1. An inlet flue 7, of circular, rectangular, or other suitable cross-sectional shape, extends though the casing 1 and opens substantially tangentially into the central chamber 6 within the filter member 5 adjacent the upper end thereof as indicated at 8. Outlet flue 10 leads from the lower portion of casing 1, outside the filter member, so that all of the gas in order to pass from inlet flue 7 to outlet flue 10 must pass through said filter member.

A separate collecting chamber 12 is disposed beneath the casing 1, said collecting chamber being shown as connected to the bottom member 3 of housing 1 by means of pipe 13. Connecting pipe 13 is preferably of about the same diameter as the lower end of the filter member, and communicates with the space within said filter member so as to permit solid material to fall by gravity from the interior of the filter member into collecting chamber 12. A discharge spout or opening 14 is provided at the bottom of collecting chamber 12, and suitable valve means such as sliding gate 15 are provided for opening or closing said discharge opening. Additional valve means such as sliding gate 17 are also preferably provided in the connecting passage 13, so that the collecting chamber may be temporarily shut off from the filtering device when the valve means 15 are to be opened for discharge of material from said collecting chamber.

The operation of the above described apparatus is as follows:

Gas containing finely divided solids in suspension therein is supplied through inlet flue 7 and enters the chamber 6 inside the filter member substantially tangentially, and then passes around and downwardly in said chamber in a cyclonic or helical path as indicated by the arrows at A in Figs. 1 and 2. During this downward progress of the gas, portions of such gas pass through the openings of filter medium 5, while the suspended solids carried thereby are retained upon the inner surfaces of said filtering medium. The whirling gases in chamber 6, however, pass at relatively high velocity in close contact with the filtering surface and serve to continuously dislodge separated solid material from such surface and cause such solid material to pass on down both under the influence of the descending column of gas and also due to gravity. The outward flow of gas through the filtering medium occurs throughout the height thereof so that by the time the gas reaches the lower end thereof all of such gas will have passed through the filtering medium, leaving behind the entire solid content thereof. The clean gas then passes through outlet flue 10 to any suitable point. It will be understood that the flow of gas through the apparatus in the above described manner is maintained by providing a suitable pressure drop between inlet flue 7 and outlet flue 10, as by supplying the gas to inlet flue 7 under suitable pressure or by drawing the gas through outlet flue 10 by means of a suction fan, or in any other suitable manner.

The solids caught by the filtering medium are, as above described, continually dislodged and caused to pass downwardly both by gravity and the downward motion of the gases, to the lower portion of chamber 6, whence such solids fall by gravity through passage 13 into collecting chamber 12. At suitable intervals the collected solid materials may be removed from chamber 12 by closing gate 17 and opening gate 15.

An advantageous embodiment of the invention is shown in Figs. 4, 5 and 6, in which the gases, or a portion thereof, are utilized not only to effect dislodgement of the solid material from the filtering surface and movement thereof toward the bottom of the filter member, but are also used to assist the action of gravity in causing the separated solid material to actually pass from the filter member into the collecting chamber. This apparatus comprises casing 1', filter member 5', chamber 6', inlet and outlet flues 7' and 10', collecting chamber 12', connecting pipe 13' and gates 15' and 17', all of said parts being substantially the same as the correspondingly numbered parts in the apparatus first described. The apparatus comprises in this case, however, an additional circulating pipe 20 leading from collecting chamber 12' to inlet flue 7'. Circulating pipe 20 is preferably connected to chamber 12' at a point somewhat removed from the point of connection of pipe 13' thereto and baffle plate 21 may, if desired, extend downwardly from the top of collecting chamber 12' between the pipes 13' and 20. A vertical partition 22 or other suitable baffle means is also preferably provided in pipe 13' for stopping the cyclonic or whirling motion of the gas before the same enters collecting chamber 12' so as to cause said gas to create a minimum of disturbance in passing through said collecting chamber.

At its upper end, pipe 20 opens as at 25 into inlet flue 7 in the same direction as the flow of gas therethrough or at right angles thereto so as to act as an ejector and cause a portion of the gas to be continually circulated through pipe 20. Suitable means, such as damper 27, may be provided in circulating pipe 20 for controlling the flow of gas therethrough.

The operation of this form of the apparatus is substantially the same as above described with the exception that part of the gas is circulated through the apparatus, passing downwardly through pipe 13', then under the baffle 21 and through pipe 20 back to the inlet flue. This circulation of a portion of the gas, which depends upon diminution of the pressure head in inlet flue 7' due to the velocity of gas flow therein, assists in the removal of the separated solid material from the filter member through connecting pipe 13' into collecting chamber 12' and prevents choking of said connecting pipe. It will also be noted as a further advantage of this construction that it provides for maintaining a higher velocity of gas flow in the lower portion of the filter member. It is evident that as the volume of gas inside the filter member is continually decreased by passage of portions thereof through the wall of said member, there is a tendency for the velocity of the whirling gas to be diminished. This is partly compensated for in either of the above described forms of my invention by the downwardly decreasing diameter of the filter member, but since in the form of the invention shown in Figs. 1 to 4 all of the gas must pass directly through the filter member, the final velocity of whirling gas at the bottom of such device must be zero, and under these conditions there may be an incomplete brushing off of solid particles from the filtering surface at this point and a consequent tendency to clog or blind the openings thereof. The continual circulation of a portion of the gas, however, as in Figs. 4, 5 and 6, serves to maintain even to the very bottom of the filter member a sufficient velocity of whirling gases to dislodge the solid material therefrom, so that all of the filtering surface is kept in open condition and all of the separated solids are carried on into the collecting chamber.

Upon entering the collecting chamber the collected solids will fall largely to the bottom thereof while the gas, with its whirling motion stopped by partition means 22, passes quietly beneath baffle 21 and up through pipe 20 and is redelivered to the incoming gases and again passed through the apparatus. Even though there may be a slight entrainment of solid particles from the collecting chamber up through pipe 20, this is not a serious disadvantage since the gas containing any such entrained particles is again subjected to a separating operation.

A modified arrangement of the circulating pipe is shown in Figs. 7 and 8, in which the apparatus is similar in general construction to the other forms above described and comprises casing 1″, filter member 5″, inlet and outlet flues 7″ and 10″, collecting chamber 12″, connecting pipe 13″ and valve gates 15″ and 17″. In this form of the invention the circulating pipe 30 extends from a position adjacent the lower end of central chamber 6″ upwardly within said chamber and through the top member 2″, and thence over and downwardly and into the inlet flue 7″, entering the same so as not to be subjected to the velocity head therein. A damper 32 may be provided for controlling the flow of gas through pipe 30.

In the operation of this form of the invention a portion of the gas will be circulated through pipe 30 and will thus serve to maintain a sufficiently high velocity of whirling gases even in the lower portion of filter member 5″ to effectively sweep off the separated solid material from the inside of said filter medium. The circulating gas does not in this case, however, assist materially in causing passage of the separated solid material into the collecting chamber, such passage of material being dependent upon gravity alone.

I have also shown in connection with this form of apparatus, means for equalizing the pressure or suction at the outside of the filter medium and thus equalizing the flow of gas through all portions of such filter member. Such equalizing means may comprise, for example, an arc shaped plate 35 disposed between the lower portion of filter member 5″ and outlet flue 10″ and provided with openings or perforations 36 for restricting to the desired extent the flow of gas therethrough. Such equalizing means are intended to counteract any tendency for excessive flow of gas through the portion of the filter member directly opposite the outlet flue 10″, by interposing an additional resistance to the flow of gas through this portion of the filter, and if desired the perforations 36 may be spaced relatively far apart in the portion of plate 35 which is directly opposite said outlet flue and relatively closer together in the portion of said plate further removed from said outlet flue so as to interpose a resistance to gas flow which is somewhat inversely proportional to the distance from the outlet flue and thus equalizing the conditions of pressure and gas flow throughout the filter member. It will, of course, be understood that similar equalizing means may also be provided in any of the other forms of the invention described herein. Thus as shown in Fig. 4, a similar baffle plate 35′ may be interposed between the filter member 5′ and the outlet 10′ therein shown.

Instead of relying upon the ejector effect of the gas stream to create the required circulation of a portion of the gas from the bottom of the central chamber or from the dust collecting chamber back into the gas stream entering the aparatus, other means may be provided for this purpose. The apparatus shown in Fig. 9, for example, is substantially the same as that shown in Fig. 7, with the exception that a fan or blower 38, driven in any suitable manner, is placed in the circulating pipe 30 for insuring the desired amount of circulation. In each of the forms of the invention shown in Figs. 4, 7 and 9, means are provided for withdrawing a portion of the gas from the lower end of the filter either downwardly as in Fig. 4 or upwardly as in Figs. 7 and 9, the effect being in each case to increase or maintain the velocity of the gas as it passes down in the filter as above stated.

It will be noted that in all of the above described forms of the invention the outer casing 1, 1′, or 1″ is cylindrical and hence of uniform cross-sectional area, while the filter member is conical. The interior of the filter member is therefore of downwardly decreasing cross-sectional area, which, as above stated, compensates for the downwardly decreasing volume of gas inside the filter and helps to keep the velocity of whirling sufficient to brush the material off the filter. The space outside the filter member and inside the casing, on the other hand, is of downwardly increasing cross-sectional area, which is also of advantage, as it accommodates the downwardly increasing volume of gas flow in this space without unduly increasing the resistance to flow. In other words, as the gas in passing downwardly through the apparatus gradually passes from the inside to the outside of the filter member, the space inside becomes smaller and smaller so as to maintain the desired velocity therein, while the space outside becomes larger and larger to accommodate the increased volume of gas without unduly increasing the pressure drop.

It should be understood that any of the means for causing circulation of gas, or any of the other particular features shown in connection with any one of the forms of apparatus, may also be applied in connection with any of the other forms of apparatus, and that many other minor modifications or embodiments of the principles of this invention may be made, without departing from the spirit thereof. Furthermore, if desired, means for mechanically assisting in the cleaning of the filter means may be provided, such as the shaking means ordinarily used on bag filters for this purpose. Such mechanical cleaning means, however, constitute no essential part of this invention.

I claim:

1. An apparatus for separating solids from gases comprising a filter member shaped substantially as a frustum of an inverted cone, means for delivering gas containing suspended solids substantially tangentially into the upper portion of said filter member, a casing surrounding and spaced from said filter member and providing a space of downwardly increasing cross-sectional area between said filter member and said casing, means for outflow of gas from the lower portion of said space, and a collecting chamber beneath and communicating with the lower end of said filter member.

2. An apparatus for separating solids from gases comprising a substantially cylindrical housing, a filter member disposed substantially centrally within said housing and having substantially the shape of an inverted frustum of a cone, means for delivering gas containing suspended solids substantially tangentially into the larger upper end of said filter, gas outlet means communicating with the lower portion of said housing exteriorly of said filter member, and a collecting chamber positioned below the smaller lower end of said filter member and communicating therewith to receive solid material falling by gravity from the interior of said filter member.

3. An apparatus as set forth in claim 2, said gas outlet means comprising an outlet conduit opening into said housing at only one side thereof, and said apparatus further comprising baffle means positioned at only the same side of said housing as said outlet conduit and between said filter member and said outlet conduit, the interior of said housing outside said filter member being otherwise substantially unobstructed whereby said baffle serves to equalize the flow of gas through different portions of said filter member.

In testimony whereof I have hereunto subscribed my name this 7th day of May, 1928.

EVALD ANDERSON.